United States Patent [19]

Clayton

[11] Patent Number: 4,835,050

[45] Date of Patent: May 30, 1989

[54] ANTIFOULING PAINT COMPOSITIONS AND METHOD

[75] Inventor: Erith T. Clayton, Baltimore, Md.

[73] Assignee: Clayton and Colleagues, Inc., Baltimore, Md.

[21] Appl. No.: 895,448

[22] Filed: Aug. 11, 1986

[51] Int. Cl.[4] ............... C25D 11/22; B63B 59/04; E02B 3/16

[52] U.S. Cl. .................. 428/328; 106/24.24; 106/15.05; 428/907; 428/461

[58] Field of Search ............ 428/907, 461, 328; 106/14.24, 14.34, 14.35, 14.39, 15.05; 524/439, 440, 441; 114/222

[56] References Cited

U.S. PATENT DOCUMENTS

| | | | |
|---|---|---|---|
| 2,583,545 | 1/1952 | Cameron | 106/15 |
| 2,877,126 | 3/1959 | Whitby | 524/439 |
| 3,097,932 | 7/1963 | Goldheim | 428/907 |
| 3,399,160 | 8/1968 | Kemp | 524/439 |
| 3,788,142 | 3/1974 | Evans | 114/222 |
| 4,082,588 | 4/1978 | Anderton et al. | 114/222 |
| 4,293,584 | 10/1981 | Clayton | 427/11 |
| 4,626,283 | 12/1986 | Martins et al. | 106/14.24 |

FOREIGN PATENT DOCUMENTS

| | | | |
|---|---|---|---|
| 431641 | 7/1935 | European Pat. Off. | 106/14.34 |
| 0167798 | 10/1983 | Japan | 114/222 |
| 0009181 | 1/1984 | Japan | 114/222 |
| 0188480 | 9/1985 | Japan | 524/440 |
| 2120267 | 11/1983 | United Kingdom | |

OTHER PUBLICATIONS

Young et al, "Antifouling Paints", *Ind. Eng. Chem.*, Apr. 1944.

*Primary Examiner*—Nancy A. B. Swisher
*Attorney, Agent, or Firm*—Larson & Taylor

[57] ABSTRACT

The invention relates to the use of voltaic cells in both leachable and non-leachable vehicles which is a unique concept. It relates to the use of hard abrasive vehicles. It relates to the use of vehicles that will permit the voltage to provide a current when the circuit is closed. The concept of a multiplicity of voltaic cells generating a voltage within the paint makes it possible to eliminate toxic ingredients such as Copper, Copper salts such as Cuprous Oxide, Mercury and its salts and other toxic ingredients such as Tributyl Tin Oxide with great benefit to the environment. The non-leachable vehicle eliminates or reduces the loss of electromotive force generating within the paint so that the paint is capable of remaining effective for years instead of the usual life of one growing season.

14 Claims, No Drawings

ANTIFOULING PAINT COMPOSITIONS AND METHOD

BACKGROUND OF THE INVENTION

The present invention relates to compositions for preventing fouling on surfaces exposed to aquatic environments. Several tests relating to antifouling compositions were done with the cooperation and assistance of an international company and dealt with three different tests in which paints were exposed at the company's test station at Kure Beach and later at Harbor Island. There were three tests covering periods of 8½ months, 401 days, and 2.15 years. The paints tested were composites of Zinc plated on Copper, Copper on Zinc and various other bi-metal alloys. The two of special interest were Copper-Zinc combinations. These flakes were extremely small particles and made excellent paints.

The intermediate series was done several years later by another international company of London, England. Their exposure tests were done in Florida and England and also dealt with the metal composites of special interest, Copper on Zinc and Zinc on Copper. These tests produced results that were contrary to all accepted knowledge. The previous tests were done in a non-leachable vehicle. These were done in a leachable vehicle.

From very early times it was believed that antifouling paints had to be put in a vehicle which permitted poison ions to migrate through the vehicle and their presence at this interface of the paint and electrolyte was what made the paint antifouling. The second company tested both leachable vehicles and non-leachable vehicles. They stated the non-leachable vehicles were unsatisfactory.

A possible explanation is that the antifouling was due to a multiplicity of voltaic cells or emf generators. With this in mind, it was theorized that any combination of dissimilar metals in a suitable vehicle whether leachable or not would create an antifouling paint. What this does is to make possible antifouling paints which do not contain toxic materials such as Copper and its salts (e.g. cuprous oxide) and Mercury and its salts and modern, very expensive, very toxic poisons such as Tributyl Tin Oxide.

No commercial use, so far as is known, has ever occurred as a result of these protracted experiments. There was a reluctance to accept the fact that non-leachable vehicle in hard abrasion resistance vehicle could ever work.

Present antifouling paint compositions are unsatisfactory. When the toxic elements used to prevent fouling are leached out of the paint film they are quickly depleted. These antifouling paints, which are in use use today, are thereby good for only one growing season and must be repainted every year. Also, these leachable paints are badly scratched and damaged by sand when boats are dragged on a beach. This damage will permit fouling to take hold.

The leaching of soluble Copper salts into navigable waters from pleasure crafts, nuclear power plants, and the like is of great concern to State and Federal Authorities especially in the areas of high concentrations of boats, and nuclear power plants. Present antifouling paints are a major cause for such concern.

A world famous authority on antifouling paints explained that tests had been made with superimposed AC current, super-imposed DC current and a combined AC DC current and that all such experiments had been entirely unsuccessful in preventing fouling. He explained that years of experience had shown that all antifouling paints to be effective had to be formulated in a leachable vehicle so that toxic ions could be released into the water in immediate juxtaposition to the antifouling surface and that a non-leachable vehicle had no chance of success.

SUMMARY OF THE INVENTION

This invention relates to a composition of matter comprising within its infrastructure, elements capable of generating an electromotive force. An electromotive force is the driving tendency behind an electric current. It is measured in volts. The electromotive force (usually abbreviated emf) of a battery is the potential difference between its terminals, when no current flows through the batteries. This potential difference called voltage serves to produce an antifouling structure which I have discovered inhibits the growth of animal marine life such as barnacles and sea worms, and also of vegetative growth. This property of the composition of matter, the correct name for which is "voltaic cell", will appear to be a large structure and function as a battery of various types. There are a variety of voltaic cells, but all of them appear to function as batteries. There are single fluid cells such as lechanché cell, the dry cell with zinc as the negative pole, ammonium chloride solution and carbon with manganese dioxide as a depolarizer, emf 1.53. The lechanché cell has amalgamated zinc solution of sal-ammonia, carbon, a depolarizer, and manganese peroxide with powder carbon, emf 1.46. The lead, lead peroxide storage type of voltaic cell is in car batteries; the negative pole is lead, the solution is sulphuric acid density 1.1 and positive pole is lead peroxide with emf of 2.2. Then there are so-called standard cells such as Weston Normal and Clark Standard and there are double fluid cells, some of which are Bunsen, Daniell and Grove. Most of these have amalgamated zinc as the negative pole, platinum as the positive pole and two solutions of sulphuric acid density of 1.136 and nitric acid density 1.33.

All of the above are called voltaic cells but practically they are essentially used as batteries and describe the type of emf generators that can be used in the practice of this invention. The type that is most useful is an emf generator or voltaic cell consisting of small particles suitable for incorporation into antifouling paints which could be used as an ordinary paint. They may consist of metals and non-metals such as zinc and graphite or of metals selected from the emf table such as aluminum and tin added as separate metal powders or an composite metal plates in which each individual particle may consist of zinc completely encapsulated in copper or copper encapsulated in zinc and the particle size of these particles may range from 4 to 15 microns on average which is small enough to make a good paint. Or it could be created in the form of a unitary structure such as porous elements in which case they could be of a single liquid type of voltaic cell. A table of the emf series of metals follows.

| ELECTROMOTIVE SERIES OF THE METALS | | | | |
|---|---|---|---|---|
| Lithium | Sodium | Chromium | Lead | Mercury (ous) |
| Rubldium | Magnesium | Iron | HYDROGEN | Silver |
| Potassium | Baryllium | Cadmium | Antimony | Palladium |
| Barium | Aluminum | Cobalt | Arsenic | Mercury (ic) |
| Strontium | Manganese | Nickel | Bismuth | Platinum |
| Calcium | Zinc | Tin | Copper | Gold |

From the above it is obvious that voltaic cells act as batteries and the like relate to large structures capable of generating and storing electric energy. This invention relates to paints which store a voltage in a paint consisting of a large multiplicity of very small particles capable of producing an emf and thus a potential difference.

An ion is an atom or group of atoms that is not electrically neutral but may carry a positive or negative electric charge. Positive ions are formed when neutral atoms or molecules lose electrons.

Ions, groups of ions, molecules ore groups of molecules would be present adjacent to the antifouling paint and the sea water electrolytes and may be present in less amount in the nonleachable vehicles. It is agreed that this happens with the standard leachable vehicle which has been in use for centuries.

It is the primary object of the present invention to provide an inexpensive, long-lasting antifouling paint for use on aquatic vehicles of all sorts.

It is a further object of the present invention to provide an antifouling paint that does not leach toxic substances into the aquatic environment.

It is yet another object of the present invention to eliminate the need to repaint antifouling paints on an annual basis.

BRIEF DESCRIPTION OF THE DRAWINGS

FIG. 1 is a graphical representation of certain antifouling tests of example number 4.

FIG. 2 is a graphical representation of certain antifouling tests of example number 5.

DETAILED DESCRIPTION OF THE PREFERRED EMBODIMENTS

This invention relates to the inclusion of a very large multiplicity of voltaic elements incorporated into a leachable or a non-leachable vehicle to form an antifouling paint that is competitive with or better than antifouling paint now commercially available, provided that it is incorporated into a suitable vehicle.

The voltaic cells may be selected from the electromotive series of metals such as Zinc and Copper. If Zinc and Copper are selected they may be intimately mixed together as separate elements. Alternatively one may be encapsulated within the other. For example Zinc may be the encapsulating metal in which case the Bi-metal flake looks like a zinc flake or it may be reversed so that the Copper is the encapsulating metal and the Bi-metal flake looks like Copper.

The mechanical mixture of the two metal powders when incorporated in a suitable vehicle makes a good antifouling paint. When it is applied to a Zinc coated steel surface or a wood surface it will, when immersed in an electrolyte such as sea water, provide millions of small individual batteries that act to prevent the attachment of marine animals such as Barnacles, Tunicates, Oysters, Clams and other organisms and also will serve to retard vegetation growth on the panels exposed at antifouling stations for months or years at a time. Most of the miniscule antifouling batteries were included in a non-leachable vehicle suitably diluted with solvent.

Three tests were made, first at Kure Beach in North Carolina and subsequently at Harbor Island, N.C. Both places known for severe fouling. Another series of tests of the Bi-metal flakes were made by an English Company that conducted tests in England and Florida. In this case the controls were the best available at the time and the toxic component was Cuprous Oxide and Mercury. The toxic agents were based on the metal content. Loading was carefully controlled at 2 lbs. per gallon of toxic agent for the controls. Since a 50/50 Copper/Zinc has only 1 lb. of Copper, while the controls were used at double this rate of toxic material, the comparison shows a much better mileage for the Bi-metal flake. Tests of the Bi-metal flake were made in both leachable vehicle and non-leachable vehicle. These tests established that Bi-metal flakes were also very effective in leachable vehicle.

These tests provided an irrefutable evidence of the effectiveness of the battery effect of two dissimilar metals capable of generating a voltage in a suitable vehicle, and that a high multiplicity of small micron size particles combined into individual amounts of well mixed separate powders constitute a new concept in antifouling paints.

The tests in North Carolina were rated on a scale from 0 to 10. Zero being complete fouling and 10 no trace of fouling. In these tests the controls were straight Copper flakes in a non-leachable vehicle and received a rating of zero, that is 100% fouled, thereby demonstating the fact that if the toxic element was prevented by a physical barrier, (i.e. a non-leachable vehicle) that prevented toxic ion escaping into the immediate environment fouling was complete. A copper surface alone produces no voltage.

It is essential in a non-leachable vehicle that the vehicle solids be kept at a minimum, consistent with paintability, by adding a paint solvent to the system that will make painting feasible but that will then evaporate leaving behind the solid contents of the vehicle, thereby permitting metal to metal contact with the paint vehicle whereby battery cells can function. If the vehicle solid content is too thick within the paint itself so that contact is lost within the paint film then the battery will no longer function and no voltage will exist. However, it is desirable to have a thin barrier film across which a voltage will flow. If the supernatant film of the vehicle is allowed to float as a barrier interposed between the batteries and sea water surface than the Barnacles, Tunicates and other fouling organisms will multiply rapidly and no antifouling will result. These elements taken together mean that if a supernatant film of vehicle solids is removed from the surface of the paint by sanding or other means and if the internal structure of the paint layer contains sufficient vehicle to prevent metal contact or alternatively are thick enough to prevent voltage generation, then all antifouling will be lost. All of the above pertains more particularly to non-leachable vehicle. Paint authorities world-wide are unanimous that for any antifouling paint to work it must be a leachable vehicle. Since all antifouling paints up to now rely on leaching of toxic material into the surrounding water this is understandable. Since the mechanisms of a multiplicity of minuscule batteries is based on entirely different principles, non-leaching vehicles are possible with the Bi-metallic element, provided the above listed parameters are observed.

Since no material is leached from a non-leachable vehicle the paint will continue to act as an antifouling agent for years at a time. The non-leachable vehicle creates a very hard durable paint film that will withstand dragging a row boat on a beach over rough abrasive sand without damage.

Since the toxic materials in a non-leachable vehicle are bound solidly into the paint and do not depend on leaching, the product of this invention does not pose a toxicity problem although adequate steps must be taken to prevent the antifouling components from rusting a steel surface. This means that a proper protective barrier must be applied to protect the steel surface. If contact is established the steel may corrode away without any fouling. On wood the problem does not exist.

The present invention may also be fabricated in flexible forms that can be releasably adhered to a surface to be protected. In this embodiment, a flexible surface such as a woven fiberglass mat is coated with the antifouling paint of the present invention. Then, this mat is adhered to any surface which needs to be protected from fouling. An advantage of this embodiment is that these mats may be removed for cleaning and repair at any time. Also, these mats may be fabricated in different sizes and shapes to conform to the needs of a specific situation. For instance, tubes used for water cooling nuclear reactors may be coated with a fiberglass mat of this type in order to prevent fouling of the cooling tube.

The compositions of the present invention substantially reduce the corrosive galvanic action of such metals as copper on a ferrous base. These compositions also permit the replacement of toxic metals such as copper by safe, inexpensive substitutes while maintaining the requisite level of antifouling effect. These compositions also provide very attractive paints with low brush friction when non-metals such as graphite are employed. These graphite paints may include graphite, activated carbon, and straight carbon. The graphite functions better if it is dried prior to incorporation into the paint. Also, the graphite may be combined with any of the metals from the electromotive series tables included herein.

EXAMPLE #1

Steel panels 4"×12". Steel protected by Zinc flake paint.

Panels exposed in North Carolina. Duration of test: 8½ months exposure in North Carolina. Test location: Dock E-6.

Paint vehicle: A Polystyrene

Rating: 0—Complete fouling. (10 means no fouling).

| Panel no mark: | 1 coat Zinc flake encapsulated on Copper flake. | Rating: 9 |
|---|---|---|
| | Duplicate of above. | Rating: 9 |
| Panel #1: | 1 coat Copper on Zinc. | Rating: 9 |
| | Duplicate of above. | Rating: 9 |
| Panel #2: | 2 coats Copper on Zinc. | Rating: 8 |
| | Duplicate of above. | Rating: 5 |
| Comments: A second coat it is believed tends to leave more vehicle solids in or on the surface layer. | | |
| Panel #3: | Copper mixed with Zinc as separate powders. | Rating: 9 |
| | Duplicate of above. | Rating: 9 |
| Panel #4: | 2 top coats Copper coated Zinc flake | Rating: 9 |

Example #2

Panels exposed at North Carolina Test Station for 401 days.

Vehicle Alkyd Resin.

| Panel no mark: | Zinc on Copper | Rating: 9 |
|---|---|---|
| | Duplicate of above. | Rating: 9 |
| Panel #1: | 1 coat Copper on Zinc. | Rating: 5 |
| | Duplicate of above. | Rating: 7 |
| Panel #2: | 2 coats Copper on Zinc. | Rating: 3 |
| | Duplicate of above. | Rating: 1 |
| Panel #3: | 2 coats mixture of Copper flake and Zinc flake. | Rating: 8 |
| | Duplicate of above. | Rating: 9 |
| Panel #4: | 2 top coats Copper coated Zinc Composite flake. | Rating: 4 |
| | Duplicate of above. | Rating: 5 |
| Panel #5: | 2 coats Zinc coated Copper. | Rating: 8 |
| | Duplicate of above. | (only 1 rust spot) |
| Panel #6: | 2 coats of Copper flake (100% rusted) | Rating: 0 |
| | Duplicate of above. (100% rusted) | Rating: 0 |

Comments on above:
1. Zinc flake encapsulated on Copper is almost always better than the reverse Copper plated on Zinc.
2. Application of 2 coats is almost always worse than a single coat, believed to be due to slight excess of vehicle in second coat.
3. The mixture of the flakes separately, that is one is not physically encapsulated by the other—the flakes are manually mixed was almost as good as composite flakes. The separate mixture was equal to the Copper on Zinc but the Zinc on Copper was slightly better.
4. The Polystyrene vehicle of Example 1 appears better than Alkyd resin of this example.
5. Exposure from June 19 to July 24 the following year encompassed a major part of the growing season, which are probably fairly longer in North Carolina.
6. All samples in this test were on steel panels.

EXAMPLE #3

Exposed at station in North Carolina.
Duration 2.15 years.

| Panel #1: | Wood Copper on Zinc. Paint is free of blisters and appears in good condition. | Rating: 7 |
|---|---|---|
| Panel #2: | Wood Zinc on Copper flake. Paint film is free of blisters and appears to be in very good condition. | Rating: 9 |
| Panel #3: | Wood Zinc on Copper flake. Paint film is free of blisters and appears to be in very good condition. | Rating: 9 |
| Panel #4: | Wood Duplicate of above | Rating: 9 |
| Panel #5: | Wood | Rating: 5 |
| Panel #6: | Wood | Rating: 8 |

Comments:

1. 2 steel panels were very badly rusted after 2.15 years and had rating of 3 and 0.
2. The test was terminated so there is no way of knowing how much longer the wood panels may have lasted with ratings of 9+ and the paint film in good condition.

EXAMPLES 4, 5 AND 6

These were conducted in Florida.

"To prevent galvanic corrosion of steel when copper is a constituent of the antifouling paint, a barrier layer or layers are first applied to the steel panel.

EXAMPLE #4

A/F EXPOSURE RESULTS OF TAINTON BI-METALS ON PRIMED STEEL 1607 VEHICLE)

Those tests were exposed in Florida on stationary panels for a period of 6 months, starting in April of 1958 and ending in October 1958, Sandblasted steel panels were used, prepared in the following manner.

1st Coat Wash Primer—1 hour dry
2nd Coat Wash Primocon—2-4 hours dry,
3rd Coat Wash Silver Primocon—Overnight dry,
4th Coat Silver Primocon—Overnight dry.
All of above were spray applied.
5th Coat Test Paint—8 hours dry,
6th Coat Test Paint—24 hours dry.
5th and 6th coats were brushed applied.
Results are as follows:

|  | Ratings | | | | | |
|---|---|---|---|---|---|---|
| Time Exposed (months) | 1 | 2 | 3 | 4 | 5 | 6 |
| Month | May | Jun | Jul | Aug | Sep | Oct |
| 50 Zinc on 50 Copper | 91 | 88 | 78 | 74 | 61 | 55 |
| 50 Copper on 50 Zinc | 92 | 89 | 80 | 74 | 52 | 46 |
| 40 Copper on 60 Zinc | 93 | 83 | 80 | 69 | 12 | 0 |
| 40 Aluminum on 60 Copper | 82 | 71 | 65 | 46 | 0 | 0 |
| 33 Aluminum on 67 Copper | 88 | 60 | 47 | 36 | 0 | 0 |
| 1607 Standard | 93 | 79 | 81 | 75 | 33 | 29 |

From the above ratings the Zinc on Copper and the Copper on Zinc show promise. Further work will be done on these two Bi-Metals.

From the above ratings the Zinc on Copper and the Copper on Zinc show promise. Further work will be done on these two Bi-Metals.

| Pigment to Vehicle Ratio in Dried Film | | | |
|---|---|---|---|
| Name | Pigment | Vehicle | Remarks |
| 50 Zinc on 50 Copper | 36.2 | 63.8 | — |
| 50 Copper on 50 Zinc | 36.2 | 63.8 | — |
| 40 Copper on 60 Zinc | 36.2 | 63.8 | — |
| 40 Aluminum on 60 Copper | 36.2 | 63.8 | — |
| 33 Aluminum on 67 Copper | 36.2 | 63.8 | — |
| 1607 Standard | 47.0 | 53.0 | 21% Active Copper |

Some of these tests results are depicted graphically in FIG. 1.

EXAMPLE #5

A/F Results—Tainton Bi-Metals On Wood

These tests were tried on wood and self primed. They were started in May 1958, and ended October 1958, a total time of immersion of 5 months.

|  | Ratings | | | | |
|---|---|---|---|---|---|
| Time Exposed (months) | 1 | 2 | 3 | 4 | 5 |
| Month | Jun | Jul | Aug | Sep | Oct |
| 50 Zinc on 50 Copper | 100 | 100 | 94 | 94 | 94 |
| 50 Copper on 50 Zinc | 100 | 100 | 100 | 86 | 92 |
| 40 Copper on 60 Zinc | 92 | 87 | 77 | 77 | 74 |
| [1]40 Aluminum on 60 Copper | 71 | 0 | 0 | 0 | 0 |
| [2]33⅓ Aluminum on 66⅔ cop. | 83 | 31 | 37 | 0 | 0 |
| [3]50 Copper on 50 Nickel | 88 | 89 | 91 | 86 | 86 |
| 694 Singapore Standard | 100 | 100 | 90 | 85 | 100 |

[1]Chipping in first month.
[2]Chipping in first month.
[3]Rust Nodules in first month.

SUMMARY

From the above results 50 Zinc on 50 Copper and 50 Copper on 50 Zinc, show the most promise when combined with 49 vehicle. All of the rest of the Bi-Metals show no promose, therefore should be discontinued.

Cost of the above two mentioned should be calculated and compared versus 49 and 694. If cost is favorable further tests should be conducted.

| PIGMENT TO VEHICLE RATIO IN DRIED FILM | | | |
|---|---|---|---|
| Name | Pigment | Vehicle | Remarks |
| 50 Zinc on 50 Copper | 74 | 26 | — |
| 50 Copper on 50 Zinc | 74 | 26 | — |
| 40 Copper on 60 Zinc | 74 | 26 | — |
| 40 Aluminum on 60 Copper | 51.5 | 48.5 | Any higher pigmentation would be impossible to apply. |
| ⅓ Aluminum on ⅔ Copper | 51.5 | 48.5 | Same |
| 50 Copper on 50 Nickel | 74 | 26 | — |
| 694 Singapore | 74 | 26 | Cuprous Oxide & Mercury |

Some of these test results are depicted graphically in FIG. 2. It should be noted that after six months, the ratings were: 50 zinc on 50 copper—94; 50 copper on 50 zinc—92; and 694 Singapore standard-100. No change occurred in zinc/copper after August.

EXAMPLE #6

A/F Tests of Tainton Bi-Metals in Alkyd

The above tests were conducted in Florida on wood starting in June 1958 and ending in October for a total time of immersion of 4 months. These panels were all self-primed.

|  | Ratings | | | |
|---|---|---|---|---|
| Time Exposed (months) | 1 | 2 | 3 | 4 |
| Month | Jul | Aug | Sept | Oct |
| 50 Copper on 50 Zinc | 100 | 77 | 12 | 0 |
| 50 Zinc on 50 Copper | 100 | 94 | 56 | 8 |

SUMMARY

Both tests blistered in one month. Contact type of pigmentation is of little value if right vehicle is not used. Above tests show little value in using an alkyd as an A/F vehicle. This type was recommended by Tainton:

| PIGMENT TO VEHICLE RATIO IN DRIED FILM | | |
|---|---|---|
| Name | Pigment | Vehicle |
| 50 Copper on 50 Zinc | 81% | 19% |
| 50 Zinc on 50 Copper | 81% | 19% |

Dry Times:
15–24 hours between coats.
24 hours before immersion.

The above results should be compared with the 401 days of exposure using an Alkyd resin in Example #2.

Ample evidence has been presented to show that the effective mechanism in the mixed metal powders or the Composite metal flake in a non-leachable vehicle is due to battery action. The vital importance of the non-leachable vehicle to be properly diluted to provide minimal insoluble resins both within the coating itself and as a supernatant layer has been demonstrated. Tests were therefore made creating a battery effect without toxic materials such as Copper, Cuprous Oxide, Mercury, Tributyl Tin Oxide, etc., all of which act to destroy fish and pollute the water particularly in areas of high concentration of boats.

As antifouling paint incorporating, for example, Carbon or Graphite with Zinc would not only eliminate the toxic material but would drastically cut the cost of raw materials. The leclanche cell, consisting of Zinc, Carbon, Ammonium Chloride as the Electrolyte and a depolarization agent such as Manganese Dioxide constitutes the basic cell for the average small battery for flashlights, etc. in use for decades around the world. The following example shows that the antifouling paint can be created without toxic materials and that in fact the battery effect is responsible for antifouling regardless of how the battery is composed provided that there are a huge multiplicity of battery cells.

Non-toxic formulations of nickel and graphite; aluminum and graphite, Zinc and graphite;, tin and graphite may be used to generate electromotive force. Further, a non-toxic formulation may be used as a metallurgically integrated metal coating on the substrate. A coating such as Zinc-tin can be applied by the portable galvanizer described in U.S. Pat. No. 4,293,584 (Clayton). These intimately mixed non-toxic elements may also be incorporated in a porous matting or the like to provide a renewable antifouling blanket.

EXAMPLE #7

50 parts by weight of fine Zinc powder were thoroughly mixed with an equal part of fine Graphite powder. These were incorporated into a paint with outdoor Urethane varnish diluted with mineral spirits. The paint was applied to small Zinc coated steel panels and exposed in a small salt water creek in mid April 1984. The panels were examined in early July. The Zinc apparently had largely dissolved leaving a black crust that had bubbles in it. There was no sign of any fouling, either vegetable or animal. Breaking the bubbles shows the shiny Zinc base coat. Portions of the crust were scraped off to show the Zinc priming coat underneath that was still bright and shiny. The panels were replaced in the water. One month later when they were re-examined there was still no fouling but the steel was showing some red rust around the edge. From the above it was evident that the quantity of Graphite may have been too large or the bubbles may have been due to water included in the Graphite. Fresh panels were made up using 90% Zinc and 10% Graphite. On other panels the Zinc was replaced with Tin, Nickel or Aluminum to vary the voltage generated by these cells. The results were most encouraging. No fouling had occurred after one month of exposure. Not a single barnacle was present anywhere but there were plenty of large barnacles on nearby wood.

EXAMPLE #8

A 16-foot trihull fiberglass runabout was painted with a mixture of Zinc dust and Graphite with Urethane outdoor varnish. The boat bottom was divided into sections with different amounts of dilution of the varnish. With the least dilution there were a few large Barnacles six to ten inches apart. With the greater dilution of non-leachable vehicle the number of Barnacles were substantially reduced.

This test was repeated the following year with similar results.

Note the inclusion of the graphite makes a most excellent smooth paint.

From the above, it may follow that in a non-leachable vehicle that a barrier exists between the cells and its electrolyte, the sea water, in which case no current should flow but voltage is present. If the voltage is sufficient to provide the antifouling then a non-leaching vehicle should last for year because there would be minimal flow of electric current to deplete the antifouling elements.

This would appear to be the case because on wood panels after 2.15 years exposure to severe fouling conditions, readings of nine plus were obtained (ten being perfect). These tests were discontinued at nine plus leaving the possibility open that they may have lasted much longer, perhaps years longer. This is perhaps confirmed by the five year life on a wooden row boat.

On the other hand there may be some current flow at a low level that would be slow enough to provide a long life to the paint and enough flow to prevent fouling.

If the applied voltage is sufficient (usually with the average battery is 1.0 to 1.5 volts) any electrical insulation thick enough to block the voltage then the whole system would collapse and absolute complete fouling would result (Zero rating). This appears to be in accordance with observed facts in which it is well established that any thick layer of insulating material will be completely fouled. To be effective the voltage of the individual cells, the Zinc Graphite for example, must break through any supernatant "films".

Increasing the E.M.F. (voltage) to a higher level subsequently improves antifouling properties. This was done with the Zinc-Graphite combination in which there was no trace of vegetation and no trace of any animal growth. If there was any electric current flow the Zinc would dissolve anodically as a result of increased voltage.

An Example of Non-Toxic Elements in a Non-Leachable Vehicles Exposed

The panels were of steel, four inches by 6 inches. The steel was protected on both sides by a substantial Zinc coating applied by the portable galvanizer. The metal powders, except the Zinc, were five to seven microns, were hydrogen reduced, purchased from Fusion Alloys Co. The Zinc powder was Federated #1 Zinc dust and the Graphite was purchased from a local store.

Seven panels in all were exposed, including samples of Aluminum Tin, Zinc Tin, Nickel Zinc, Zinc Graphite, Aluminum Zinc. All panels were of steel and all were protected by a substantial Zinc coat.

The dry powders were mixed together very thoroughly. The vehicle was a non-leachable urethane varnish, outdoor grade. The samples were exposed for 2.5 months during the height of the growing season.

All of the samples gave most encouraging results, but in this test two were outstanding: the 50—50 Zinc Tin and the 90% Zinc and 10% Graphite. Both samples were completely free of all growth, both animal and vegetative and there was no slime giving them a rating of 10. Most of the other samples were almost free of barnacles, and if there were barnacles they were very tiny especially in comparison with barnacles growing on the wooden frames which were on average about 20 times as large.

Aside from the size, some of the very tiny barnacles had dried and dropped off.

The 90% Zinc, 10% Graphite was also completely free of all barnacles, there was no grass and no slime. The coating was clean and bright to the touch and was an excellent mix for painting. It rated below the Zinc Tin because there were some bubbles in the Graphite. It was learned later that this was probably due to absorbed water in the Graphite.

The validity of the non-leachable vehicle in a non-toxic formulation was considered to be confirmed by this test and others that preceded it. The 90% Zinc 10% Graphite was better than a previous ratio of 50/50 Zinc-Graphite.

The combination of the Zinc with a non-metal was striking and further validates the voltaic cell principle.

Since the product is so new and different, a better name for this product is "an electrochemical paint".

TABLE SUMMARIZING RESULTS OF THREE EXPOSURE TESTS ONLY THOSE PANELS HAVING RATINGS OF 9+, 9 and 8 ARE SHOWN

| Exposure Date | Duration of Exposure | Type | Anti-Fouling Pigment | Vehicle |
|---|---|---|---|---|
| RATING F.R.9 plus | | | | |
| 5-26-50 | 2.15 yrs. | wood 5W | Zn on Cu | Polystyrene Emulsion |
| " | " | wood 6W | | " |
| " | " | wood 6W | | " |
| 6-19-52 | 8½ months | Wood | Zn on Cu (1 coat) | Glyptal 2458 |
| " | " | " | Zn on Cu (1 coat) | " |
| " | " | " | Cu on Zn (1 coat) | " |
| " | " | " | Cu on Zn (1 coat) | " |
| " | " | " | Cu on Zn (2 coats) | " |
| RATING F.R.9 | | | | |
| 6-19-51 | 401 days | Steel | Zn on Cu (2 coats) | Glyptal |
| " | " | " | Zn on Cu (2 coats) | " |
| 6-19-52 | 8½ months | Wood | Cu on Zn (2 coats) | " |
| " | " | " | Zn on Cu | " |
| RATING F.R.8 plus and F.R.8 | | | | |
| 6-19-51 | 401 Days | Steel | Zn on Cu (2 coats) | |
| 6-19-52 | 8½ months | Wood | Cu on Zn | |
| 7,25,52 | 2.15 yrs. | Wood | | |

I claim:

1. A non-toxic composition of matter capable of providing long-lasting suppression of the growth of fouling organisms in an aquatic environment which consists essentially of a vehicle selected from leachable and non-leachable vehicles, and at least two components dispersed in said vehicle, said components having different electrochemical potentials such that said composition is capable of generating a voltaic current.

2. A composition of matter as claimed in claim 1 wherein said vehicle comprises a durable non-leachable vehicle.

3. A composition of matter as claimed in claim 1 wherein said vehicle comprises a leachable vehicle and said at least two components consist essentially of non-toxic components.

4. A composition of matter as claimed in claim 1 wherein said at least two components are selected from the group consisting of zinc, carbon, aluminum, tin, and nickel.

5. An article of commerce comprising
 a substrate,
 a layer of a composition of matter capable of long-lasting suppression of the growth of fouling organisms in an aquatic environment adhered to at least one surface of said substrate,
 said composition consisting essentially of a mixture of at least two components having different electrochemical potentials such that said composition is capable of generating a voltaic current and a thin barrier layer of a material selected from plating medium and leachable or non-leachable paint vehicle on the surface of said antifouling layer.

6. An article of commerce in accordance with claim 5 wherein said antifouling layer comprises a metallic coating and said thin barrier layer comprises plating medium.

7. An article of commerce in accordance with claim 5 wherein said antifouling layer comprises a paint and said barrier layer comprises a vehicle selected from leachable and non-leachable vehicles.

8. A method of providing long-lasting suppression of fouling of a substrate when exposed to an aquatic environment comprising:
 applying a non-toxic antifouling composition to a substrate which will be exposed to fouling conditions, said composition comprising a mixture of at least two components having different electrochemical potentials.

9. A method in accordance with claim 8 wherein said composition comprises a paint vehicle selected from leachable and non-leachable vehicles and said step of applying said composition comprising spraying, dipping or brushing.

10. A method in accordance with claim 8 wherein said step of applying said composition comprises metal plating.

11. A method in accordance with claim 8 wherein said step of metal plating comprises mechanical plating at ambient temperature.

12. A method in accordance with claim 9 wherein said composition comprises a leachable vehicle and said components consist essentially of non-toxic components.

13. A method in accordance with claim 9 wherein said composition comprises a non-leachable vehicle.

14. A method of providing long-lasting suppression of fouling of a substrate when exposed to an aquatic environment comprising:
 incorporating a non-toxic antifouling composition into the substrate, said composition comprising a mixture of at least two components having different electrochemical potentials.

* * * * *